United States Patent [19]

Bakowski

[11] 4,056,134

[45] Nov. 1, 1977

[54] CLAMP ASSEMBLY

[75] Inventor: Thomas G. Bakowski, West Seneca, N.Y.

[73] Assignee: Eaton Yale Ltd., Canada

[21] Appl. No.: 721,015

[22] Filed: Sept. 7, 1976

[51] Int. Cl.² ............................................. A01G 23/08
[52] U.S. Cl. ........................... 144/2 Z; 144/309 AC; 214/3; 269/31
[58] Field of Search ................. 214/3, 147 R, 77 R, 214/85; 280/179 R; 269/31, 13, 58; 294/106; 144/2 Z, 3 D, 309 AC

[56] References Cited

U.S. PATENT DOCUMENTS

| | | | |
|---|---|---|---|
| 3,071,170 | 1/1963 | Pease et al. | 269/31 |
| 3,254,686 | 6/1966 | Boyd et al. | 144/3 D |
| 3,517,711 | 6/1970 | Resser et al. | 144/3 D X |
| 3,549,029 | 12/1970 | Rutter | 280/179 X |
| 3,924,667 | 12/1975 | McKenzie | 144/309 AC X |

Primary Examiner—Harrison L. Hinson
Assistant Examiner—W. D. Bray
Attorney, Agent, or Firm—Teagno & Toddy

[57] ABSTRACT

A processor clamp for a tree harvester. The tree engaging surface of a movable arm of the clamp is made up of two elements, a convex cam portion and a concave portion, to insure that all trees within the diameter range of the harvester will be clamped along a line either perpendicular to a downwardly angled, fixed tree engaging surface or tending to force the tree upward along the surface. The fixed tree engaging surface is adapted to penetrate a tree clamped thereon, but permits the tree to roll off into a bunk when the movable arm is released. The clamp assembly is easily removable from and attachable to the harvester to selectively use the harvester as a single tree machine or a multiple tree machine.

7 Claims, 4 Drawing Figures

CLAMP ASSEMBLY

The present invention relates to improved apparatus for harvesting trees, and more particularly to an improved clamp assembly for holding a tree during the processing thereof by a tree harvesting apparatus.

U.S. Pat. No. 3,894,568 discloses a tree harvester in which a felling head is used to hold a tree in position for delimbing and topping by means of a processing head travelling along a horizontal processing boom. One shortcoming of such a machine is that using the felling head to perform a clamping function in the processing phase of the harvesting cycle precludes working on more than one tree at a time.

A known means for enabling a harvester to work on more than one tree at a time is to provide a secondary clamp means associated with the processing boom so that the felling head can be freed to fell a second tree while a first tree is being processed. Examples of such machines are disclosed in U.S. Pat. Nos. 3,618,647 and 3,924,667.

One problem associated with prior art harvesters employing a secondary clamp is that of insuring the release of a processed tree from the clamp into a bunk on the machine or to the ground. Some depend on the release of the opposite end of the tree as the tree is topped to carry the tree out of the clamp, and some employ separate ejector means to positively release the tree from the clamp.

Another problem associated with such clamps is that as the delimbing mechanism is moved along the tree a substantial force is applied to the clamp mechanism tending to pull the tree out of the clamp. The stationary and movable clamp elements must be designed to withstand this force.

It can be appreciated that while a tree must be securely clamped for processing, it must also be ejected from the clamp quickly and easily when processing is completed. Accordingly, it is an object of this invention to provide such a clamp in which both of these objectives are accomplished using a simple and trouble-free mechanism.

Another object of the invention is to provide a processor clamp in which a movable member securely holds the tree for processing but which permits the tree to roll free of the clamp by gravity when the movable member is released.

Another object of the invention is to provide a processor clamp which is capable of handling trees over a wide range of diameters with equal efficiency.

Another object of the invention is to provide a processor clamp in which the forces tending to pull the tree out of the clamp are taken up primarily by stationary elements of the clamp.

In order to meet the above objectives, the present invention provides a clamp assembly mounted on the processing boom of a tree harvester, which provides a stationary clamping surface angled downwardly toward a bunk mounted alongside the processing boom. A movable clamp element travels between a first position in which it is pivoted out of the way of a tree being placed in position for processing to a second position forcing the tree into contact with the angled surface. The movable element is shaped in such a way that the clamping force is always along a line perpendicular to the angled surface or tending to force the tree up the angled surface, over a wide range of tree diameters. For example, a typical harvester can handle trees from 3 inches in diameter through 14 inches in diameter. The angled clamping surface is formed on two spaced apart plates which are relatively thin so that they cut into the tree when a clamping force is applied by the movable element. This insures that most of the force applied by delimbing will be taken by these plates, rather than by the movable element.

The force applied by the movable element, the angle of the stationary surface, and the thickness of the plates, are selected so that although a log is clamped securely to the angled clamping surface to the extent of the spaced plates acting as knife edges cutting into the wood, the tree will still readily roll off the surface into the bunk when the movable element is released.

Another feature of the invention is the means by which the clamp assembly is attached to the processing boom so that the harvester can be readily converted from a single tree machine to a multi-tree machine and back again. To accomplish this the clamp assembly is pinned to a plate member welded to the processor boom. The pins are easily removable from the end of the boom, and the plate does not interfere in any way if the harvester is used as a single tree machine.

Other objects and advantages of the invention will become more apparent from the following description when taken in connection with the accompanying drawings; wherein:

DESCRIPTION OF THE DRAWINGS

Referring to FIG. 1, there is illustrated a tree length harvester, designated generally by the numeral 12, comprising a felling boom assembly 16, a processing boom assembly 18, a bunk 20, and an operator's cab 22, all of which are mounted on the front frame of an articulated carrier 14.

Figure 1:
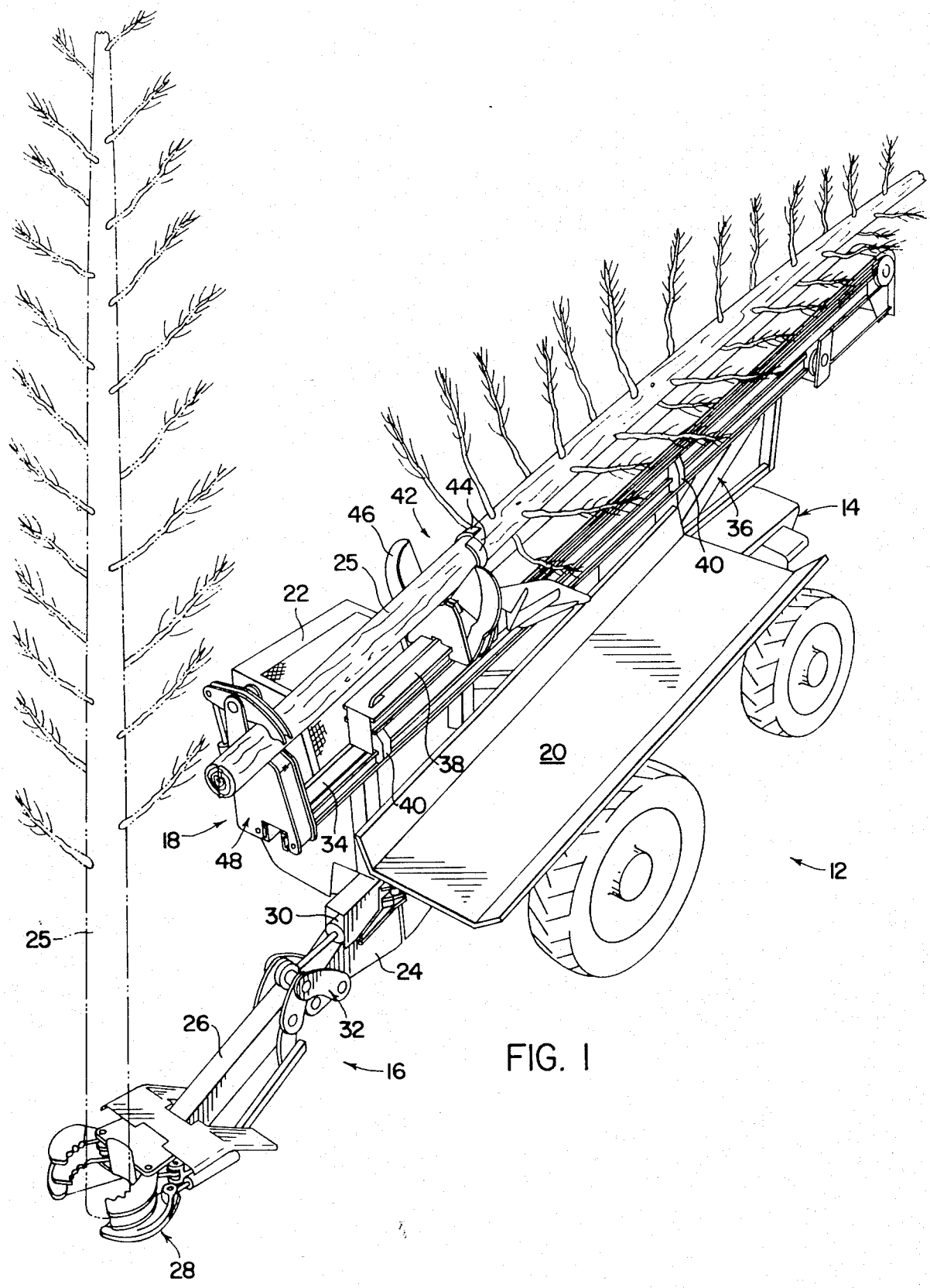
FIG. 1 is a perspective view of a tree harvester incorporating the invention.

The felling boom assembly 16 comprises an inner boom section 24, an outer boom section 26, and a felling head 28. The outer boom section 26 is pivotally attached to the inner boom section 24, and is moved from the felling position illustrated to a position for depositing a tree 25 on the processing boom by means of a hydraulic cylinder 30 acting between the carrier frame, and a linkage assembly 32 connecting the inner and outer felling boom sections. Details of the felling boom assembly can be found in U.S. Pat. No. 3,896,862, and details of the felling head in U.S. Pat. No. 3,831,647.

The processing boom assembly 18 comprises a fixed boom section 34 mounted to the carrier frame by means of a support assembly 36, a movable boom section 38 mounted for linear movement relative to the fixed boom section 34 by means of roller supports 40, and a delimber head 42 mounted on rollers (not shown) for movement along the movable boom section 38. The movable boom section is moved relative to the fixed boom section and the delimbing head is moved relative to the movable boom section by a conventional system comprising a hydraulic cylinder (not shown) acting between the two boom sections and a system of reeved cables acting between the boom sections and the delimbing head.

The delimber head comprises a set of delimber blades 44 engageable with the trunk of a tree 25 to strip the branches off the tree as the delimber head moves along the movable boom, and a topping shear assembly 46 operable to cut off the top of the tree when a usable tree length has been delimbed.

Details of a processing boom assembly as described above can be found in U.S. Pat. No. 3,894,568 and will not be described further herein.

Figure 2:
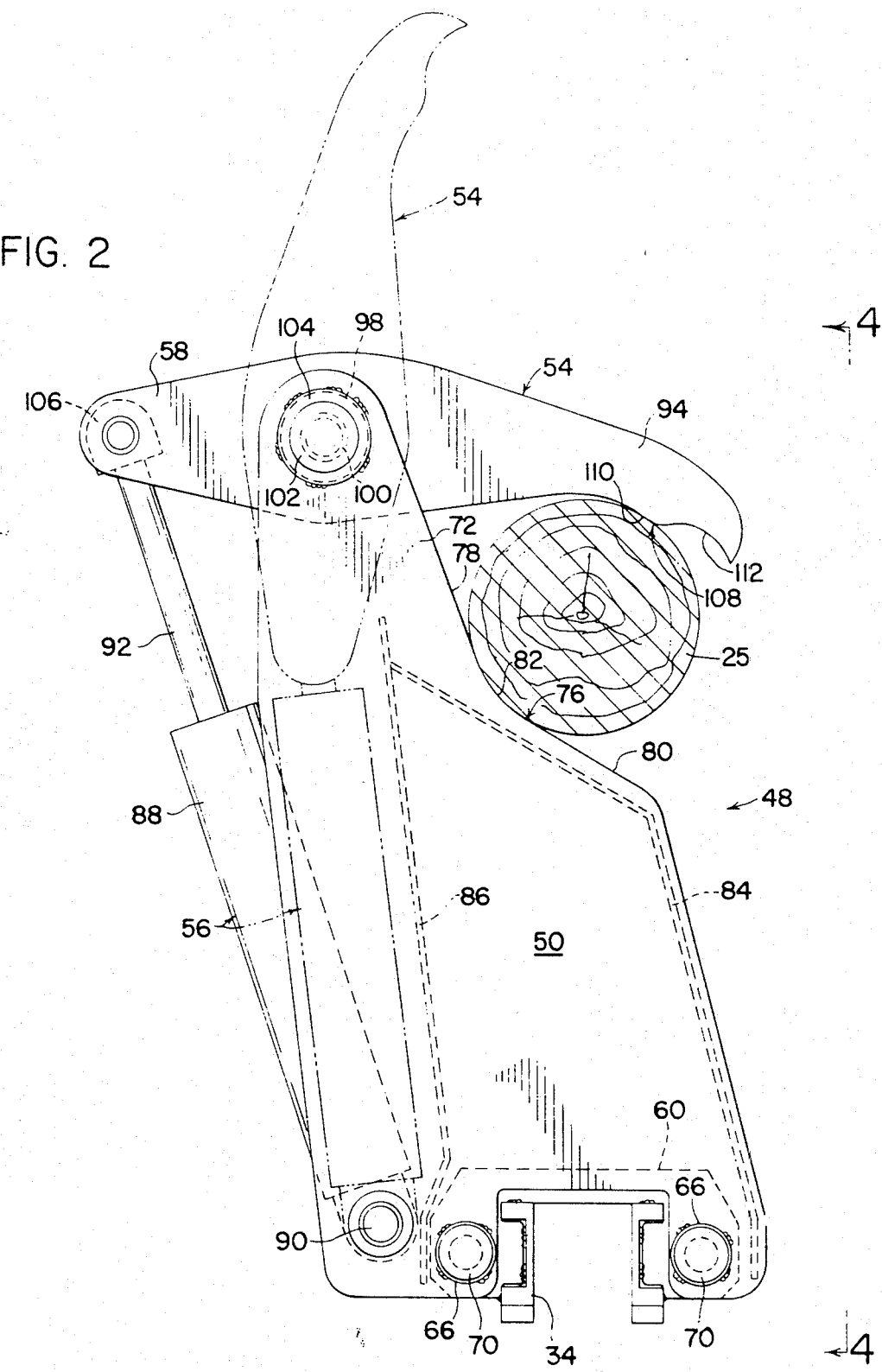
FIG. 2 is a front elevation view of the invention shown in two positions of operation.
Figure 3:
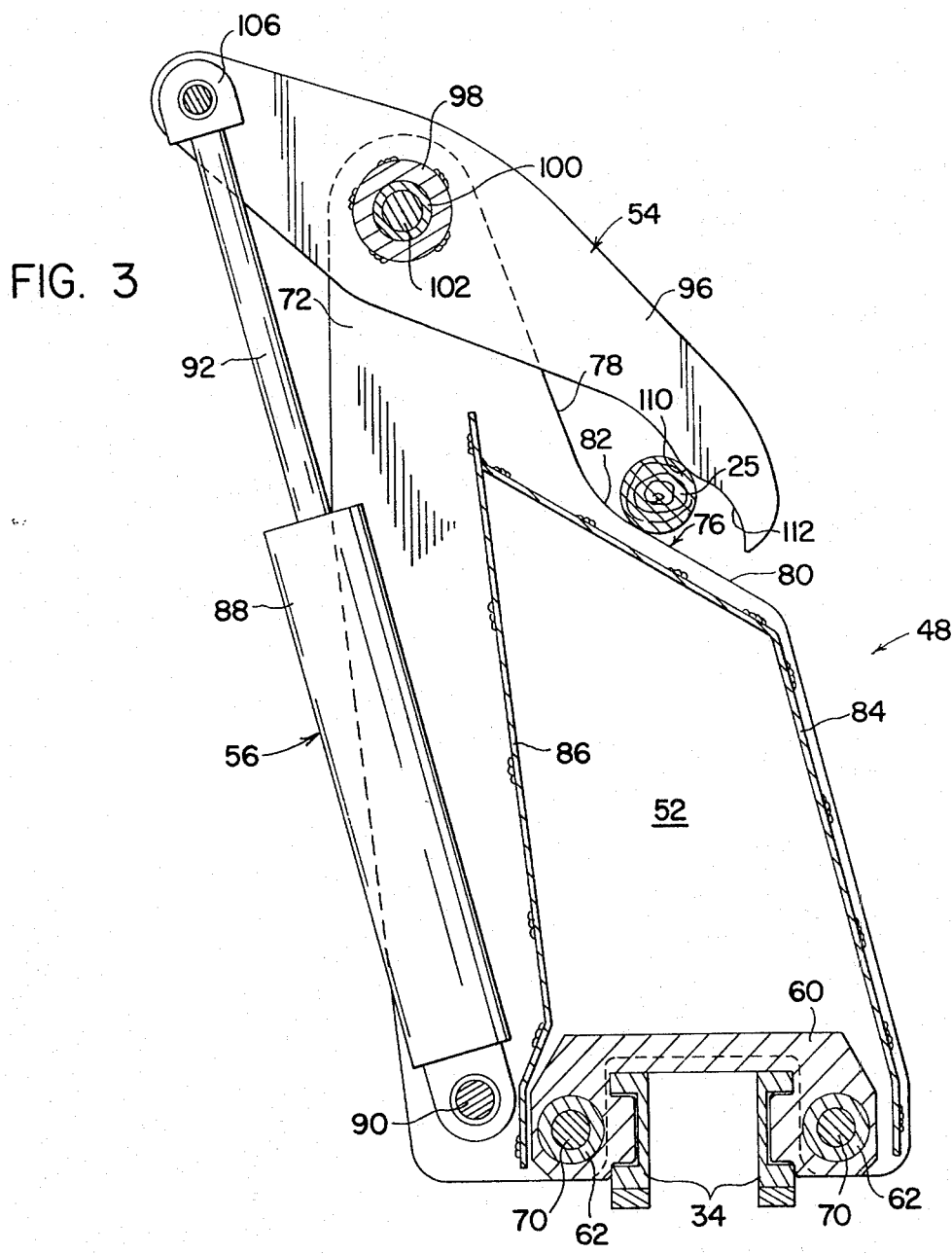
FIG. 3 is a sectional view of the invention showing the invention in a third position of operation.
Figure 4:
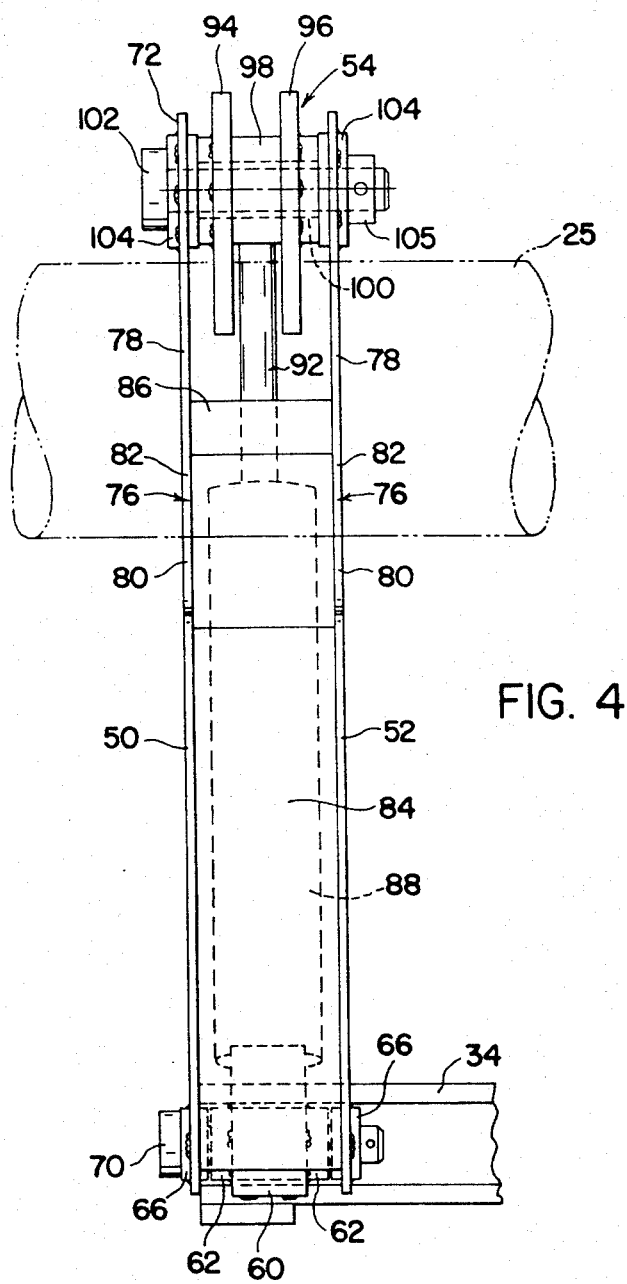
FIG. 4 is a side elevation view of the invention as viewed from line 4—4 of FIG. 2.

In accordance with the present invention a clamp assembly, designated generally by the numeral 48, is attached to the fixed boom section 34. Referring to FIGS. 2, 3 and 4 the clamp assembly comprises a pair of spaced frame plates 50, 52, a clamp arm assembly 54 located between the frame members 50, 52 and pivotally attached thereto, and a hydraulic cylinder 56 also located between and pivotally attached at one end to the frame plates 50, 52 and pivotally attached at the other end to an extended portion 58 of the clamp arm.

Each of the spaced frame plates 50, 52 comprises a flat steel plate having an upwardly extending support arm portion 72 to which the clamp arm 54 is pivotally mounted, and having a generally downwardly angled tree engaging surface 76 formed on an edge thereof. Viewing FIGS. 2 and 3, the tree engaging surface 76 is made up of two intersecting surface elements, a first surface element 78 formed adjacent the base of the support arm portion 72 and disposed at a relatively steep acute angle from the horizontal, and a second surface element 80 disposed at a lesser acute angle from the horizontal and forming an obtuse angle with the first surface element 78. The two tree engaging surface elements 78 and 80 are blended together with a relatively large radius arc 82.

The two frame members 50, 52 are separated by a pair of plate members 84 and 86 welded to each frame member. The outer plate 84 is disposed just below the surface elements 78, 80 of each plate so that the tree engaging surface 76 is in the form of a knife edge capable of penetrating the surface of a tree in engagement therewith. It should be recognized that the term "knife edge" is a relative one, and the surfaces are not necessarily sharpened from the overall plate thickness.

The inner plate 86 is disposed inwardly from the left hand edge of the plates 50, 52, leaving a pocket partially enclosing the clamp cylinder 56. In the illustrative embodiment the cylinder body 88 is pivotally mounted at 90 adjacent the lower end of the frame plates 50, 52, and the piston rod 92 is pivotally attached to the extended portion 58 of clamp arm 54.

Referring particularly to FIG. 4, the clamp arm 54 is made up of two identical plate members 94, 96 spaced apart along and welded to a shaft member 98. A bushing member 100 is received within a bore formed through the shaft 98, and a pivot pin 102 is received within the bushing 100 and within bushing members 104 welded to the plates 50, 52 and retained axially by a collar 105 pinned thereto. A mounting member 106 is welded or otherwise attached to the free end of the piston rod 92, and is received between the two arm plates 94, 96 and pinned thereto in a conventional manner.

Each of the arm plates 94, 96 has a tree engaging surface 108 formed thereon, made up of two surface elements. The first surface element is a convex cam-like element 110, formed inwardly from the free end of the arm, and the second is a concave element 112 formed adjacent the free end of the arm. Each of the elements is designed to contact a tree on a line either perpendicular to the surface element 80 or along a line angled slightly inwardly of the clamp assembly toward the intersection of the surfaces 78, 80, tending to force the tree into the arc 82. In FIG. 2, a tree 25 at or near the capacity of the harvester is illustrated and is contacted by the convex cam element 110 of the clamp arm tree engaging surface 108. In FIG. 3 there is illustrated a tree of about the smallest usable diameter, also contacted by the convex cam portion. Trees of intermediate size will also be contacted by the convex cam portion.

In the event that a tree 25 is positioned somewhat offline on the tree engaging surface 76, i.e., to the right of the tree position illustrated, the concave element 112 will contact the tree, tending to move it upward along the surface 76.

The two arm plates 94, 96 which make up the clamp arm 54 are of somewhat thicker section than the frame plates 50, 52 to insure that when a tree is clamped between the arm 54 and the surface 76, only the surface 76 will penetrate the tree, thus substantially relieving the clamp arm 54 of the force applied to the tree by the delimber head as it moves along the tree, tending to pull the tree out of the clamp assembly.

The clamp assembly 48 is mounted on the fixed boom section 34 for easy attachment and removal to readily convert the harvester between single and multiple tree operation. A relatively massive mounting block 60 is welded or otherwise securely fixed to the fixed boom section 34. The mounting block is generally of inverted U-shaped configuration and has bushings 62 welded in place within holes formed in the legs of the U. The lower end of each of the frame members 50, 52 also forms an inverted U, having bushings 66 welded in place within holes formed in each leg, and the spaced frame members straddle the block 60 with the bushing bores in alignment. Pins 70 extend through the bushings to attach the clamp assembly to the boom section 34. Each of the pins 70 has a head formed at one end and a transverse hole at the other end to receive a cotter pin or the like to hold the pins in place axially once the clamp assembly is in place.

OPERATION

In operation, a tree 25, as shown in broken lines in FIG. 1, is gripped by the felling head 28, sheared, and then tilted backward by retracting the felling boom cylinder 30 to place it in the full line position of FIG. 1. At this point the clamp arm assembly 54 is in the broken line position of FIG. 2, and the movable boom 38 and delimbing head 42 are retracted to a position adjacent the clamp assembly 48.

When the tree is in place on the processing boom assembly 18, with the trunk of the tree contacting the tree engaging surface 76 and received within the delimbing blades 44 and top shear blades 46, the cylinder 56 is pressurized, extending rod 92 and closing the clamp arm 54 to clamp the tree between the tree engaging surfaces 76 and 108. The felling head 28 can then be opened and the felling boom retracted to start felling another tree while the first is being processed.

When the clamp arm 54 closes on the tree the edges of the frame plates 50, 52, which define the tree engaging surface 76, will penetrate the surface of the tree 25. As the movable boom 38 and the delimbing head are extended the delimbing blades 44 are closed against the tree, and the limbs are sheared off the trunk.

When the boom and delimbing head are fully extended, or when a minimum usable tree diameter is reached, the topping shear is closed to shear off a delimbed, tree length log. The clamp assembly 54 is then opened to allow the processed log to roll down the surface 80 and into the bunk 20. The angle of the surface 80, the thickness of the plates 50, 52, and the force applied to the arm assembly 54 are all selected such that there is sufficient penetration of the wood surface to substantially relieve the arm of the delimbing forces, but not enough to prevent the tree from readily rolling down the surface 80 once the clamp arm is released.

I claim:

1. In apparatus for processing trees including a substantially horizontal processing boom, means for depositing a cut tree on said processing boom, and delimber means engageable with said cut tree and movable along said processing boom to delimb said tree;

a clamp assembly mounted on said processing boom in position to receive a tree deposited on said processing boom, said clamp assembly comprising a frame fixed to said boom; a first tree engaging surface formed on said frame and disposed at an angle extending downwardly from the horizontal; a clamp arm pivotally mounted to said frame and having a second tree engaging surface formed thereon; and means for moving said arm from a first position out of the way of a tree being deposited on said boom and a second position putting said second tree engaging surface in clamping engagement with a tree on said first tree engaging surface, said second tree engaging surface comprising a first convex surface element engageable with a tree placed on a first area of said first tree engaging surface and a second concave surface element engageable with a tree placed on a second area of said first tree engaging surface.

2. Apparatus as claimed in claim 1, in which said first tree engaging surface comprises a first element disposed at a first angle to the horizontal and a second element disposed at a second angle to the horizontal smaller than said first angle, said first and second elements being joined to form an obtuse included angle.

3. Apparatus as claimed in claim 1, in which said first tree engaging surface is operable to cut into the surface of a tree clamped between said first and second tree engaging surfaces.

4. Apparatus as claimed in claim 3 in which said clamp assembly comprises a stationary frame assembly comprising a first plate, a second plate parallel to and spaced from said first plate, and pivot means mounting said clamp arm between said first and second plates, said first tree engaging surface being defined by an edge of at least one of said parallel plates.

5. Apparatus as claimed in claim 4, in which said clamp arm comprises first and second parallel plate members with said second tree engaging surface being defined by an edge of at least one of said parallel plate members, the edge defining said second tree engaging surface being thicker than the edge defining said first tree engaging surface.

6. Apparatus as claimed in claim 4, including a hydraulic cylinder disposed between said first and second parallel plates and having one end pivotally attached to said parallel plates and the other end pivotally attached to said clamp arm.

7. Apparatus as claimed in claim 4, including attachment means for attaching said clamp assembly to said processing boom comprising an inverted generally U-shaped mounting block fixed to said processing boom, said mounting block having a through hole formed in each leg thereof extending parallel to said boom and each of first and second plates of said stationary frame assembly having complementary holes formed therein wherein said stationary frame assembly fits in straddling relationship to said mounting block with said holes in alignment; a pair of pins receivable in said holes to pin said frame to said block; and means engageable with said pins to prevent axial movement thereof.

* * * * *